(12) United States Patent
Ji et al.

(10) Patent No.: US 7,063,913 B2
(45) Date of Patent: Jun. 20, 2006

(54) DIFFUSION MEDIA WITH MICROPOROUS LAYER

(75) Inventors: Chunxin Ji, Rochester, NY (US); Jeanette E O'Hara, Honeoye, NY (US); Mark F Mathias, Pittsford, NY (US)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 10/925,853

(22) Filed: Aug. 25, 2004

(65) Prior Publication Data
US 2006/0046926 A1    Mar. 2, 2006

(51) Int. Cl.
*H01M 4/96* (2006.01)
(52) U.S. Cl. .............................. 429/42; 429/41; 429/45
(58) Field of Classification Search ................... 429/20, 429/44, 45
See application file for complete search history.

(56) References Cited
U.S. PATENT DOCUMENTS

| 5,718,947 A | 2/1998 | Martin et al. ............... 427/243 |
| 6,350,539 B1 | 2/2002 | Wood, III et al. |
| 2004/0038808 A1* | 2/2004 | Hampden-Smith et al. . 502/180 |
| 2005/0084742 A1* | 4/2005 | Angelopoulos et al. ....... 429/44 |

* cited by examiner

*Primary Examiner*—Patrick Joseph Ryan
*Assistant Examiner*—Ben Lewis
(74) *Attorney, Agent, or Firm*—Harness, Dickey & Pierce, P.L.C.

(57) ABSTRACT

Specially prepared gas diffusion media improve the performance of PEM fuel cells. The media are made by first dipping an electrically conductive porous material such as carbon fiber paper into a suspension of hydrophobic polymer and drying the paper to create a desired deposition pattern of hydrophobic polymer on the substrate. Then a paste containing a fluorocarbon polymer and carbon particles is applied to a desired side of the substrate, and thereafter the paste and hydrophobic polymer are sintered together at high temperature on the paper. In particular, nonionic surfactants remain on the carbon fiber paper after the initial hydrophobic polymer is applied to the electrically conductive porous material. When the paste is coated on the dried paper, the paste is in contact with a hydrophilic surface.

27 Claims, 8 Drawing Sheets

DIFFUSION MEDIA WITH MICROPOROUS LAYER

FIELD OF THE INVENTION

This invention relates to fuel cells and methods for improving water management during operation of the fuel cells. It further relates to methods for preparing diffusion media for use in fuel cells.

BACKGROUND OF THE INVENTION

Fuel cells are increasingly being used as power source for electric vehicles and other applications. An exemplary fuel cell has a membrane electrode assembly (MEA) with catalytic electrodes and a proton exchange membrane formed between the electrodes. Gas diffusion media play an important role in PEM fuel cells. Generally disposed between catalytic electrodes and flow field channels in the fuel cell, they provide reactant and product permeability, electronic conductivity, and heat conductivity, as well as mechanical strength needed for proper functioning of the fuel cell.

During operation of the fuel cell, water is generated at the cathode electrode based on electrochemical reactions involving hydrogen and oxygen occurring within the MEA. Efficient operation of a fuel cell depends on the ability to provide effective water management in the system. For example, the diffusion media prevent the electrodes from flooding (i.e., filling with water and severely restricting $O_2$ access) by wicking product water away from the catalyst layer while maintaining reactant gas flow from the bipolar plate through to the catalyst layer.

The gas diffusion media are generally constructed of carbon fiber containing materials. Although carbon fibers are themselves relatively hydrophobic, it is usually desirable to increase the hydrophobicity or to at least treat the carbon fiber with a more stable hydrophobic coating. Adding a hydrophobic agent such as polytetrafluoroethylene (PTFE) to the carbon fiber diffusion media is a common process for increasing the hydrophobicity. This process is normally done by dipping carbon fiber papers into a solution that contains PTFE particles and other wetting agents, such as non-ionic surfactants.

Even though coating the diffusion media with PTFE generally improves cell performance, further improvement is still desirable, especially as it relates to the ability of the fuel cells to shed product water and operate at high relative humidities.

SUMMARY

The performance of fuel cells can be improved by providing them with water management through the use of specially prepared gas diffusion media. A simplified process lowers production costs and shows promising performance for high current density and water management in a PEM fuel cell. An electrically conductive porous material such as carbon fiber paper is first dipped into a suspension of hydrophobic polymer, which contains non-ionic surfactants as wetting agents, and then it is dried to create a desired hydrophobic polymer distribution on the substrate. Then a paste containing a second fluorocarbon polymer and carbon particles—a so called microporous layer (MPL)—is applied to a desired side of the substrate, and thereafter the paste and first hydrophobic polymer are sintered together at high temperature on the paper. In particular, non-ionic surfactants remain on the carbon fiber paper after the first fluorocarbon polymer is applied. When the paste is coated on the dried paper, the paste is in contact with a hydrophilic surface. This is believed to improve the integration between the carbon particles and fluorocarbon particles of the paste and the carbon fiber paper.

In addition to accomplishing the production of the gas diffusion medium with only a single sintering step, the performance of the diffusion medium may be improved by infrared drying of the solvent in the dispersion of the first hydrophobic polymer. As the solvent is evaporated by the relatively low temperature and the homogeneous heat induced by the infrared drying period, a favorable distribution of hydrophobic polymer on carbon fibers and thermoset binder areas of the porous substrate material occurs. In addition, the hydrophobic polymer distribution across the bulk of the carbon fiber paper can be further controlled by the drying temperature and drying configuration.

Fuel cells containing the diffusion media are provided, wherein the diffusion media are installed in the fuel cell adjacent the anode and the cathode. The gas diffusion medium is installed in the fuel cell with its paste-coated side adjacent the electrode surface.

BRIEF DESCRIPTION OF THE DRAWINGS

The present invention will become more fully understood from the detailed description and the accompanying drawings, wherein.

DETAILED DESCRIPTION

Figure 1A:
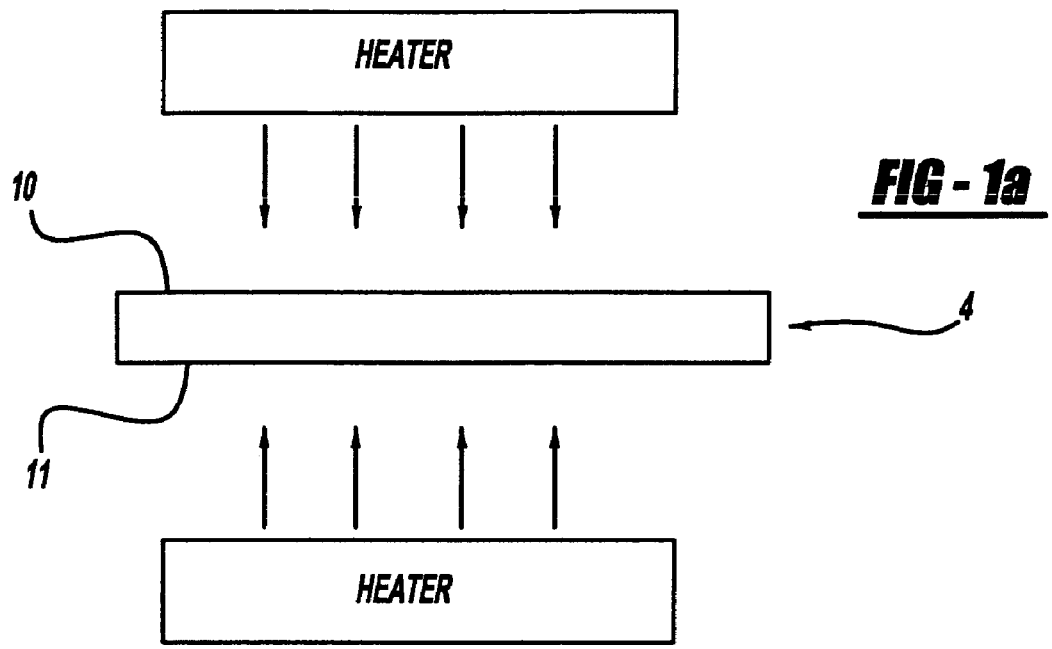
FIGS. 1 to 3 illustrate through plane distribution of fluorocarbon polymer in porous substrates.

In one embodiment, the invention provides a method for preparing a diffusion medium for use in a PEM fuel cell. The method comprises applying a polymer composition comprising a first fluorocarbon polymer, a surfactant, and a solvent to an electrically conductive porous substrate to form a coated substrate in the form of a coated sheet and removing the solvent from the coated substrate without removing the surfactant. Thereafter, a microporous layer comprising carbon particles and a second fluorocarbon coated polymer is applied to the coated substrate. Then, the substrate is heated at a temperature sufficient to remove the surfactant and sinter the first and second fluorocarbon polymer. No sintering or sintering step is carried out between removing the solvent and applying the microporous layer. The microporous layer is applied as a paste containing carbon particles, fluorocarbon polymer particles, and one or more aqueous or non-aqueous solvents sufficient to form the microporous layer into a paste.

A preferred method comprises immersing an electrically conductive porous substrate in a polymer composition comprising the first fluorocarbon polymer solvent and surfactant, wherein the substrate is in the form of a sheet having two surfaces. Solvents are then removed from the substrate by exposing at least one surface of the substrate to infrared radiation. Then a coating composition comprising carbon particles of a second fluorocarbon polymer is applied onto a surface of the substrate to form a coated substrate. Thereafter, the coated substrate is heated above 290° C. to remove the surfactant and then to 380° C. to sinter the fluorocarbon polymers.

In another embodiment, fuel cells are provided comprising an anode, a cathode, a proton exchange membrane disposed between the cathode and the anode, a cathode flow field adjacent the cathode, and an anode flow field adjacent the anode. A diffusion medium is disposed between the cathode and the cathode flow field. The diffusion medium contains a first surface comprising a microporous layer facing the cathode and a second surface exposed to the cathode flow field, wherein the diffusion medium is made by a process described above. In another embodiment, the fuel cell also contains a diffusion medium disposed between the anode and the anode flow field, with the surface facing the anode comprising the microporous layer.

A fuel cell stack is also provided that comprises a plurality of fuel cells such as described above. Methods for operating the fuel cell comprise supplying oxygen to the anode and hydrogen to the cathode of the fuel cell.

The electrically conductive porous material or substrate for use in the invention is in general a porous 2-D flexible material that may be wetted by water or other solvents associated with solutions of polymers as described below. In one embodiment, the porous material (also called a sheet material) may be made of a woven or non-woven fabric. A surfactant or wetting agent is added to the polymer solution to enable the polymer and the solvent to wet on the fibers.

In a preferred embodiment, the sheet material is made of a carbon fiber substrate such as carbon fiber paper. Carbon fiber based papers may be made by a process beginning with a continuous filament fiber of a suitable organic polymer. After a period of stabilization, the continuous filament is carbonized at a temperature of about 1200° C.–1350° C. The continuous filaments can be woven into carbon cloth or chopped to provide shorter staple carbon fibers for making carbon fiber paper. These chopped carbon fibers are made into carbon fiber paper sheets or continuous rolls through various paper making processes. Thereafter, the carbon fiber papers are impregnated with an organic resin and molded into sheets or rolls. The woven carbon cloth and the molded carbon paper sheets or rolls may then be carbonized or graphitized at temperatures above 1700° C. Suitable carbon fiber based substrates are described, for example in Chapter 46 of Volume 3 of Fuel Cell Technology and Applications, John Wiley & Sons, (2003), the disclosure of which is helpful for background and is incorporated by reference. In various embodiments, the substrates take the form of carbon fiber paper, wet laid filled paper, carbon cloth, and dry laid filled paper.

For paper production, the carbon fiber papers are impregnated with a carbonizable thermoset resin. Generally any thermoset resin may be used. For example, phenolic resins are preferred because of their high carbon yield and relatively low cost. After a final carbonization or graphitization the carbon fiber papers have a structure characterized as carbon fibers held together with a binder. The binder is made up of the carbonized thermoset resin.

Carbon fiber papers may be thought of as a non-woven fabric made of carbon fibers. Carbon fiber paper is commercially available in a variety of forms. In various embodiments, for example, the density of the paper is from about 0.3 to 0.8 g/cm$^3$ or from about 0.4 to 0.6 g/cm$^3$, and the thickness of the paper is from about 100 µm to about 1000 µm, preferably from about 100 µm to about 500 µm. Typical porosities of commercially available papers are from about 60% to about 80%. Suitable carbon fiber papers for use in fuel cell applications as described below are available for example from Toray Industries USA. An example of commercially available carbon fiber paper from Toray is TGPH-060, which has a bulk density of 0.45 gm/cm$^3$ and is approximately 180 micron thick.

The first fluorocarbon hydrophobic polymer used in the invention and deposited on the sheet material by the methods of the invention is one that will settle out of an emulsion or precipitate out of a solution under the evaporating conditions described below. Preferably, the polymer deposited onto the sheet material is one that will remain stably in contact with the portions of the sheet during conditions of its use in the eventual end application, such as a diffusion medium in a fuel cell. As discussed below, the compatibility or stability of the polymer in contact with the sheet material may be enhanced by certain post-curing steps where the coated sheet material is heated to a high temperature (e.g., 380° C. for PTFE) to fix the structure of the polymer on the sheet material.

In a preferred embodiment, the polymer used is one that imparts a hydrophobic character to the substrate sheet material where the polymer is deposited. The polymer renders the surface of the substrate hydrophobic if the surface free energy of the polymer material is less than the surface free energy of the sheet material itself. Surface free energy of the polymer and the sheet material may be measured by and correlated to the contact angle of water in contact with the polymer or sheet material, respectively. For example, if the contact angle of water on the polymer is greater than the contact angle of water on the sheet material, then the polymer may be considered a hydrophobic material. If the contact angle of water on the polymer is less than the contact angle of water on the sheet material, the polymer may be considered as a hydrophilic polymer.

Non-limiting examples of hydrophobic polymers include fluororesins. The terms "fluororesin" and "fluorocarbon polymer" are used interchangeably unless otherwise indicated. In various embodiments, the first fluorocarbon polymer, and the second fluorocarbon to be discussed below, are fluorine-containing polymers, made by polymerizing or copolymerizing one or more monomers that contain at least one fluorine atom. Non-limiting examples of fluorine-containing monomers that may be polymerized to yield suitable fluorocarbon polymers include tetrafluoroethylene, hexafluoropropylene, vinylidene fluoride, perfluoromethyl vinyl ether, perfluoropropyl vinyl ether, and the like. The presence of fluorine carbon bonds is believed to be responsible for the hydrophobic nature of these polymers.

A preferred fluorocarbon polymer is polytetrafluoroethylene (PTFE). PTFE is preferred in some embodiments because of its wide availability and relatively low cost. Other fluorine-containing polymers may also be used. Suitable fluorocarbon polymers include without limitation PTFE; FEP (copolymers of hexafluoropropylene and tetrafluoroethylene); PFA (copolymers of tetrafluoroethylene and perfluoropropylvinylether); MFA (copolymers of tetrafluoroethylene and perfluoromethylvinylether); PCTFE (homopolymers of chlorotrifluoroethylene); PVDF (homopolymers of vinylidene fluoride); PVF (polymers of vinylfluoride); ETFE (copolymers of ethylene and tetrafluoroethylene); and THV (copolymers of vinylidene fluoride, hexafluoropropylene, and tetrafluoroethylene). Aqueous dispersions of these and other fluorocarbons are commercially available, for example from DuPont. The dispersions may be conveniently prepared by emulsion polymerization of fluorine-containing and other monomers to form the polymers.

Alternatively, the dispersions may be made by combining polymer powder, solvent, and surfactants. The polymer composition may comprise from 1–90% by weight of the fluorocarbon polymer with the balance comprising water and surfactant. For example, DuPont T30 PTFE solution is available containing 60% by weight PTFE particles.

The polymers are applied to the porous sheet material by wetting the sheet material in a wetting composition including the polymer and a solvent. In some embodiments, the wetting composition may be provided in the form of an emulsion. Solutions may also be used. In some embodiments, the wetting compositions contain surface-active materials or other agents to hold the polymer in solution or suspension, or to aid in wetting the sheet material. For example, an emulsion used to wet the sheet material may include from 1 to about 70 wt. % particles of a hydrophobic polymer such as polytetrafluoroethylene. In other embodiments, ranges of 1%–20% are preferred. In a preferred embodiment, the polymer composition contains approximately 2% to 15% of the polymer solids by weight. As noted above, the polymer composition may contain surface-active agents or wetting agents in addition to solvents such as water and polymer particles such as polytetrafluoroethylene particles.

The solvent is preferably water, and may further comprise organic solvents. In a preferred embodiment, the solvent is water. Generally, non-ionic surfactants are used as wetting agents, with the result that no metal ions will be left in the carbon fiber diffusion media after the wetting agents are decomposed during high temperature treatment. Non-limiting examples of surfactants include nonylphenol ethoxylates, such as the Triton series of Rohm and Haas, and perfluorosurfactants.

In a preferred embodiment, a substrate is prepared by applying the polymer composition to at least one surface of the substrate. The polymer composition may be applied to both sides of the substrate by immersing the porous-substrate (e.g., a carbon fiber paper or cloth) into a fluorocarbon dispersion. In a typical procedure, the substrate is dipped into the fluorocarbon dispersion and removed after a time of soak. In other embodiments, the polymer composition may be applied to only one surface of the substrate, for example, by spraying. Exposure of the substrate to the fluorocarbon polymer dispersion occurs for a time sufficient to provide the substrate with the proper amount of fluoropolymer. A wide range of loadings of PTFE or other fluorocarbon may be applied to the carbon fiber substrate. In some embodiments, it is desirable to incorporate about 2 to 30% polymer by weight of the diffusion medium, the percent fluorine being measured after the drying and other steps noted below. In other embodiments, at least 5% by weight polymer is incorporated into the diffusion medium. Typically the substrates may be dipped or immersed in the fluorocarbon dispersion for a few minutes to obtain an appropriate loading of fluorocarbon on the substrate. In various embodiments, the dispersion contains from 1% to 50% by weight of fluorocarbon particles. Dispersions having concentrations of particles in the preferred range may be made by diluting commercial sources of the dispersions as necessary to achieve the desired concentrations. In a non-limiting example, a dispersion containing 60 weight percent (%) PTFE may be diluted 20 times with de-ionized water to produce a dispersion containing 3% by weight PTFE particles.

As noted above, the time of exposing the substrate to the fluorocarbon polymer dispersion is long enough for resin particles to imbibe into the pores of the carbon fiber paper or cloth, yet short enough to be an economically viable process. Generally, the time of soaking and the concentration of the fluorocarbon polymer particles, as well as the nature of the resin, may be varied and optimized to achieve desired results.

After applying the polymer composition to at least one surface of the substrate, it is preferred to remove excess solution before further processing. In one embodiment, the substrate may be removed from the liquid dispersion and the excess solution allowed to drip off. Other processes are possible, such as rolling, shaking, and other physical operations to remove excess solution.

The diffusion medium is then dried by removing the solvent. Removal of the solvent may be achieved by a variety of methods, such as convective heat drying or infrared drying.

In some embodiments, the substrate is dried at a suitable slow rate to ensure homogeneous hydrophobic polymer distribution on the substrate surface. For example, the solvent may be removed by heating below the boiling point of the solvent, for example in a quiescent convection oven. Preferably the heating is carried out at a temperature 20° to 30° below the boiling point of the solvent. In the example of water, it is preferred that the maximum temperature of heating be 70° C. or less and preferably 60° C. or less.

In preferred embodiments, the heating of the substrate to remove solvents is accomplished with infrared heating. Infrared heaters operate in a frequency range above the visible, with a low-end wavelength cutoff of about 0.76 microns usually accepted as defining the infrared range. Infrared panel heaters are commercially available. Radiant heaters, also known as spot heaters or space heaters, operate by emitting light from a body heated by electric resistance. Radiant heaters operate at a variety of wavelengths. Commercial heaters are available that operate at peak wavelength emissions of 1–1.1 microns, at about 3 microns, and at about 5 microns. Gas radiant infrared heaters may also be used. For removing water, it is preferred to operate the infrared heaters at about 3 microns or above, so that the infrared radiation is efficiently absorbed by the water.

In a typical procedure, the front of an IR heater is made of black cloth to enable homogeneous heating. The temperature of the wet carbon fiber paper surface can be adjusted both by the IR heater power controller and by adjusting the distance of the heater from the paper. In a non-limiting example, the IR panel heater may be placed about 60 cm above the carbon paper. Preferably, the temperature on the sample surface during IR heating is less than 70° C. (when used with an aqueous dispersion).

As the solvent is removed from the substrate, the hydrophobic fluorocarbon polymer is deposited onto the carbon fiber diffusion medium. At least some of the fluorocarbon polymer will be deposited during the drying step at one or both surfaces of the substrate. The micron scale distribution of the deposition of polymer can be affected and controlled by a number of means. Although the invention is not limited by theory, it may be noted that typically, carbon fiber papers are produced by combining carbon fibers with a binder such as a phenolic resin. In the process of making the paper, the resin is carbonized by heating the paper to as high as 2400° C. The result is a carbon paper characterized by areas of carbon fibers and by areas of binder. It is believed that slow drying and homogeneous heating over the substrate surface result in homogeneous fluorocarbon distribution over carbon fibers and binders.

The through-plane distribution of fluorocarbon can also be varied according to the invention. For example, the deposition of fluorocarbon particles onto one or both surfaces of the substrate as the solvent is being removed by drying can be varied by blocking one side of the substrate during the drying or by carrying out the drying with both sides open. In a non-limiting example, one side of the substrate can be blocked by laying the wet porous material onto a solid surface such as a glass slide. When the uncovered surface is exposed to a source of heat, such as in an oven or from an infrared heater, the solvent evaporates through the uncovered surface, depositing fluorocarbon polymers as it evaporates. Alternatively, if both sides of the wet porous substrate are unblocked during the drying, such as by laying on metal racks or with other means, solvent leaves from both surfaces of the substrate, depositing polymer at both surfaces. The infrared heat can be applied from one side of the substrate or both sides of the substrate at the same or different temperatures, thus resulting in different fluorocarbon polymer through-plane distribution within the substrate.

The polymer distribution can be controlled by the drying rate. Relatively faster drying tends to result in relatively more of the polymer depositing on the open surface and a relatively higher polymer gradient from the surface to the bulk of the substrate than does relatively slower drying.

In various embodiments, evaporating conditions are applied while the porous material is still wet with solvent. In a preferred embodiment, the sheet material is heated to remove the solvent, such as discussed above with respect to infrared heating. In other embodiments, a vacuum may be pulled to evaporate the solvent, or air or other gas may be blown across the surface of the sheet material to facilitate evaporation. Combinations of such evaporating conditions may also be employed.

Figure 1B:
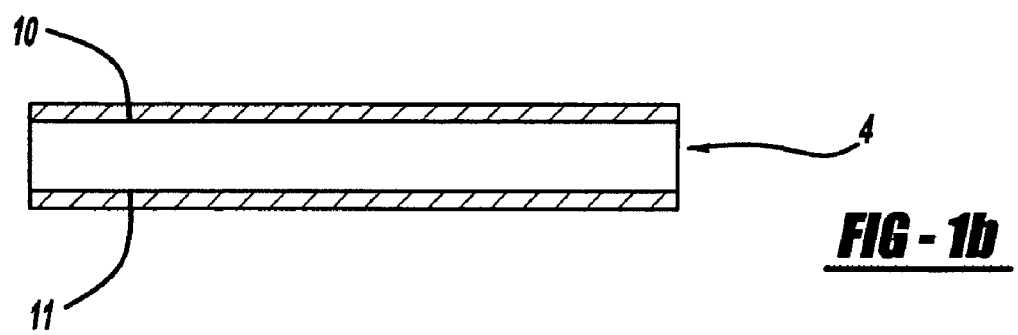
Figure 1C:
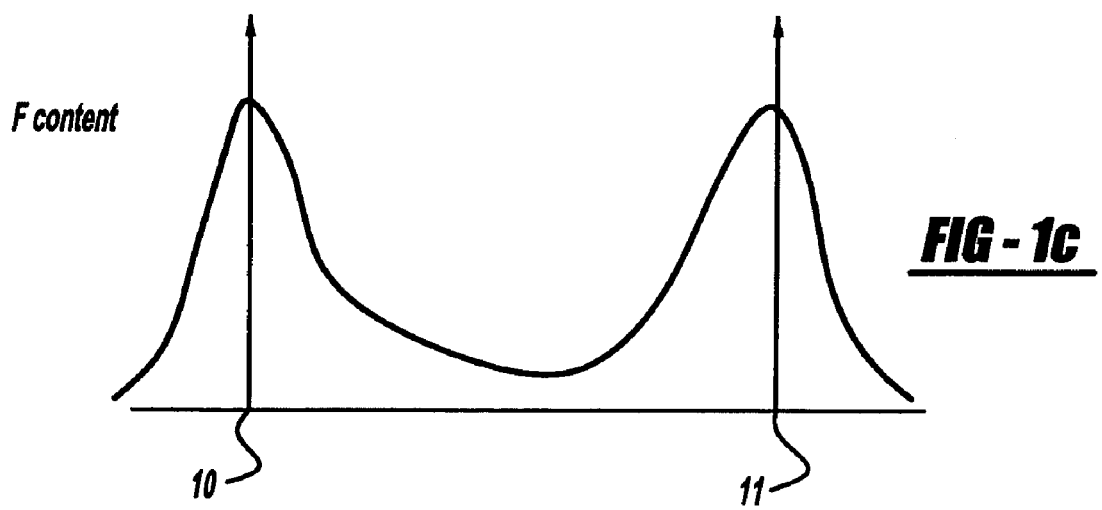
Figure 2A:
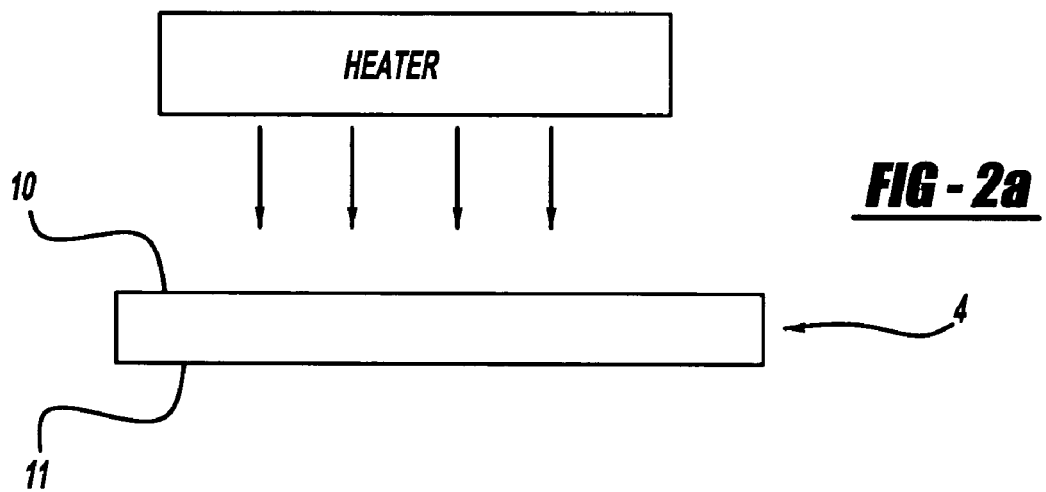
Figure 2B:
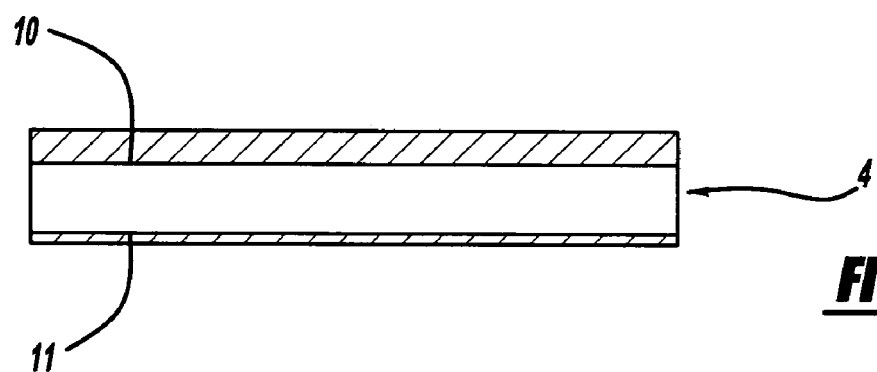
Figure 2C:
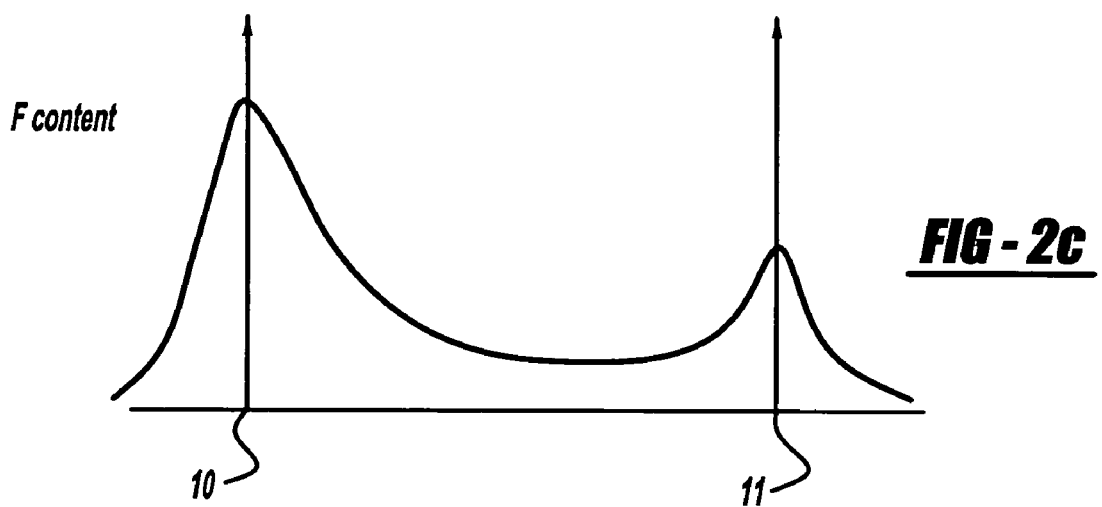
Figure 3A:
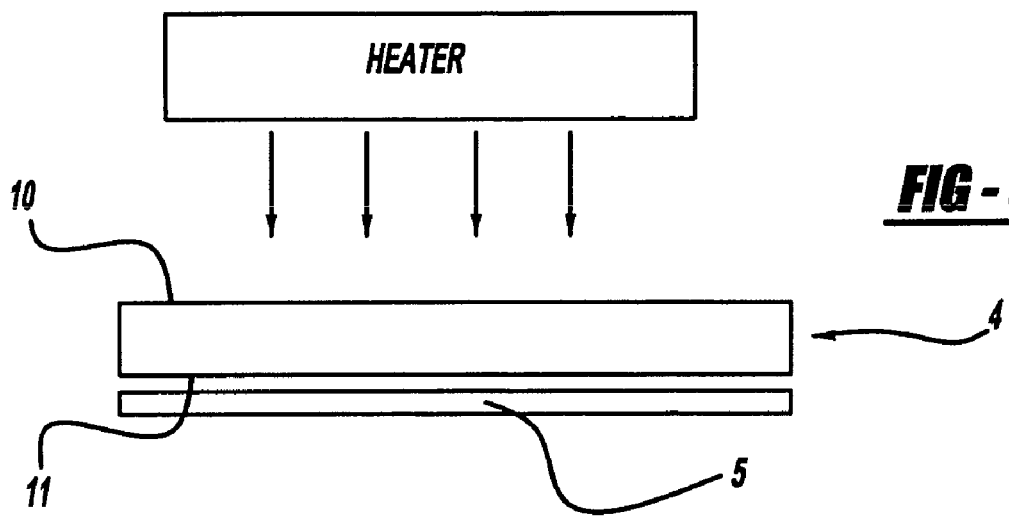
Figure 3B:
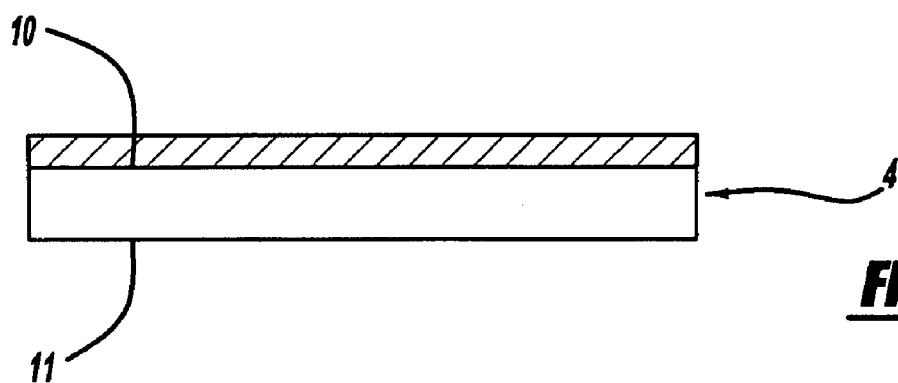

FIGS. 1–3 illustrate three embodiments of drying the porous substrate after initial application of the first fluorocarbon polymer and the resulting through plane polymer distribution. In FIG. 1a, infrared heat is applied to both sides 10 and 11 of a wetted porous substrate 4. The heat evaporates the solvent from the porous substrate, and polymer is deposited as the solvent evaporates. FIG. 1b illustrates the increased concentrations of deposited polymer at surfaces 10 and 11, while FIG. 1c illustrates the results of a hypothetical element map of fluorine in the through plane direction from 10 to 11. FIG. 2 illustrates qualitative results of a drying accomplished by infrared heating on one surface 10 only of the porous substrate. FIGS. 2b and 2c show the expected gradient where relatively more polymer would be deposited at the surface 10 facing the heater. FIG. 3 illustrates the situation where the drying (illustrated with infrared heating) takes place while the "back" side 11 of the porous substrate 4 is blocked by a solid member 5. In this embodiment, the blocked side 11 of the substrate has little deposited polymer at the surface.

The in-plane distribution of polymer can be varied by drying the porous substrate while in contact with a pattern member as described in U.S. patent application Ser. No. 10/824,032 filed Apr. 14, 2004, the complete disclosure of which is incorporated by reference. In this embodiment, the solvent leaves the porous substrate at the opening of the pattern member, leaving polymer deposited in a pattern corresponding to the holes or openings in the pattern member.

The paste to be applied to the dried porous substrate before the sintering step contains carbon particles and particles of a hydrophobic fluorocarbon polymer. The paste further contains sufficient water and/or other solvents to provide the consistency of a paste. Exemplary carbon particles include, without limitation, carbon black, graphite particles, ground carbon fibers, and acetylene black. The fluorocarbon polymers in the paste can be any of the fluorocarbon polymers or fluororesins discussed above. A preferred fluorocarbon polymer for making the paste is PTFE. In various embodiments, the paste is applied to the substrate by conventional techniques such doctor blading, screen printing, spraying, and rod coating.

In practice, the paste is made from a major amount of solvents and a relatively lesser amount of solids. The viscosity of the paste can be varied by adjusting the level of solids. The solids contain both the carbon particles and the fluorocarbon polymer particles in a ratio by weight of from about 9:1 to about 1:9. Preferably, the weight ratio of carbon black to fluorocarbon polymer is from about 3:1 to about 1:3. The fluorocarbon particles are conveniently supplied as a dispersion in water. An exemplary paste composition contains 2.4 grams acetylene black, 31.5 mL isopropanol, 37 mL deionized water, and 1.33 g of a 60% by weight dispersion of PTFE in water. This paste has a weight ratio of acetylene black to fluorocarbon polymer, on a dry basis, of about 3:1.

The paste is applied onto the dried porous substrate to provide a microporous layer that extends from the surface into the interior of the paper. In various embodiments, the microporous layer is about 5 to about 20% of the thickness of the paper. For example, with a typical paper 200 microns thick, the microporous layer is from about 10 to about 30 microns thick above the surface of the paper. Penetration of the microporous layer into the bulk of the paper can range up to about 100 μm, and depends on the viscosity of the paste. The amount of paste to apply to a paper can be determined from the density of the solids, the area of the paper, and the thickness of microporous layer desired. In various embodiments, a paste is applied to a paper at areal loadings of about 1.0 to about 2.5 mg/cm$^2$, based on the weight of the solids in the paste.

Figure 3C:
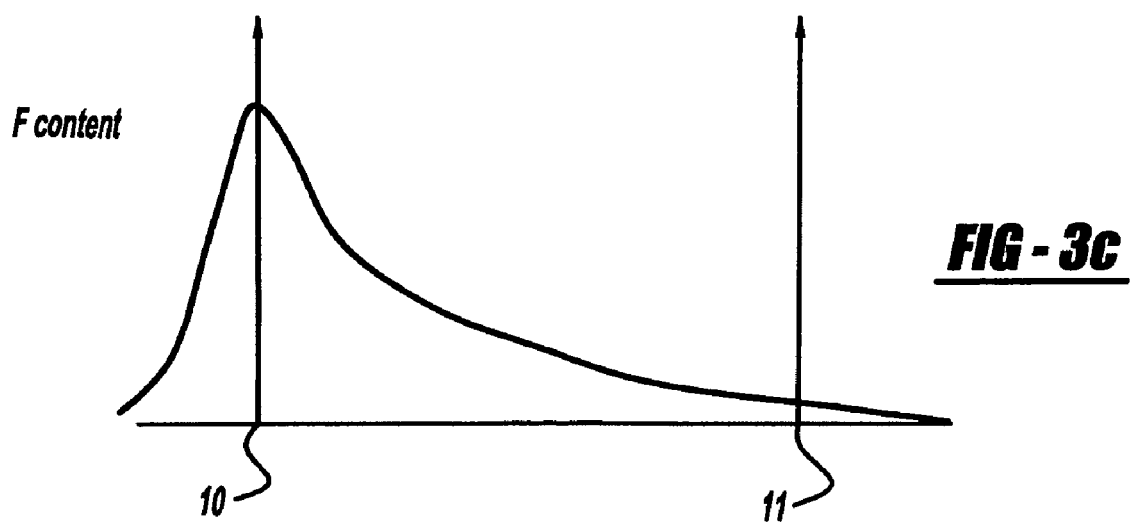

In one aspect, diffusion media produced by the invention have a gradient of fluorocarbon polymer through the plane of the diffusion medium, as shown in FIG. 1C, FIG. 2C and FIG. 3C. In this aspect, the concentration of fluorocarbon polymers at the surface of the diffusion medium is greater than at the center. Such a gradient forms naturally during the drying steps discussed above. It has also been observed that the through-plane gradient depends on the rate of drying. Generally, when the drying is relatively slow, a smaller gradient is produced, wherein more of the fluorocarbon particles stay on the inside of the substrate. On the other hand, when drying is faster, the fluorocarbon polymer tends to deposit more on the surfaces of the substrate, with less remaining on the interior.

In addition to slow or fast drying affecting the through plane distribution of fluorocarbon polymer, the in-plane distribution of fluorocarbon polymer on the carbon fiber based substrates can be varied and controlled by such means as using pattern members in the drying step, or by accomplishing the drying step with infrared radiation. In one aspect, the concept is illustrated by the example of infrared drying of the wet porous substrate to remove the solvent. Infrared drying can be either slow or fast, depending on the power used. A relatively faster infrared drying will lead to a larger through-plane gradient of fluorocarbon polymer, while a relatively slower infrared drying rate will lead to a relatively smaller gradient.

Of course, a further contribution to a through plane fluorocarbon gradient is provided by the presence on one side of the diffusion medium of the microporous layer containing the carbon particles and the fluorocarbon polymer particles. Generally, the amount of fluorocarbon polymer applied to the substrate in the paste is significantly higher than the fluorocarbon polymer applied to the surface with the initial application onto the porous substrate of the fluorocarbon polymer dispersion.

Figure 4A:
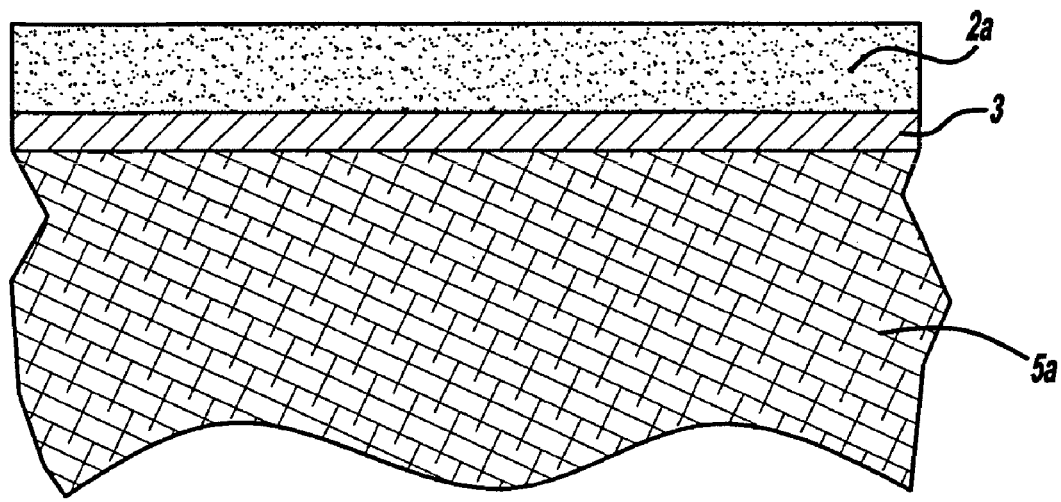
FIG. 4 is a cross-sectional illustration of a microporous layer coating on porous substrates.
Figure 4B:
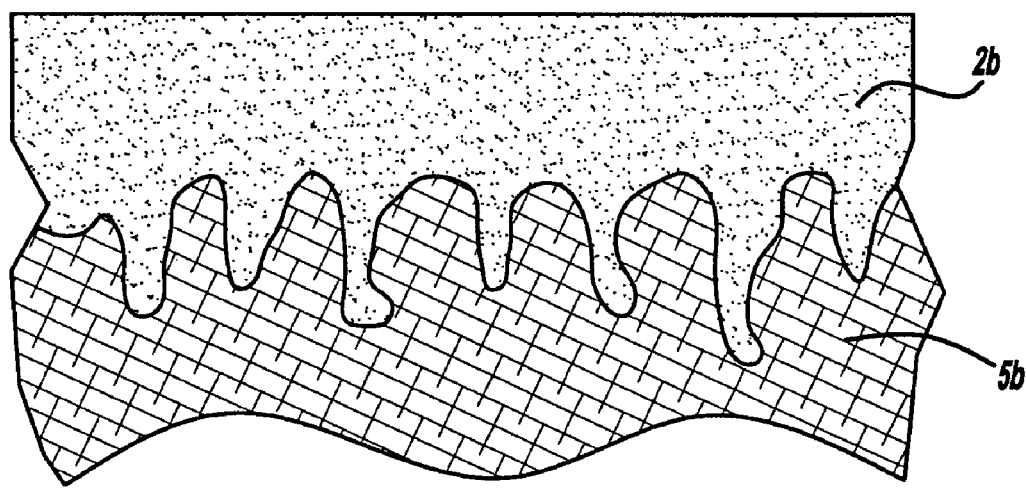

FIG. 4 illustrates a difference between the structures of porous diffusion media prepared by the one-step sintering process of the invention and a two-step sintering process. A two step sintering process results in a porous substrate 5a having a relatively sharp interface with a microporous layer 2a and a sintered PTFE layer 3a from the first fluorocarbon polymer, as shown in FIG. 4a. However, with one step sintering, the MPL is coated on a hydrophilic surface. As shown for illustrative purposes in FIG. 4b, the microporous layer 2b penetrates into the porous substrate 5b, resulting in a good integration with the substrate.

Figure 5:
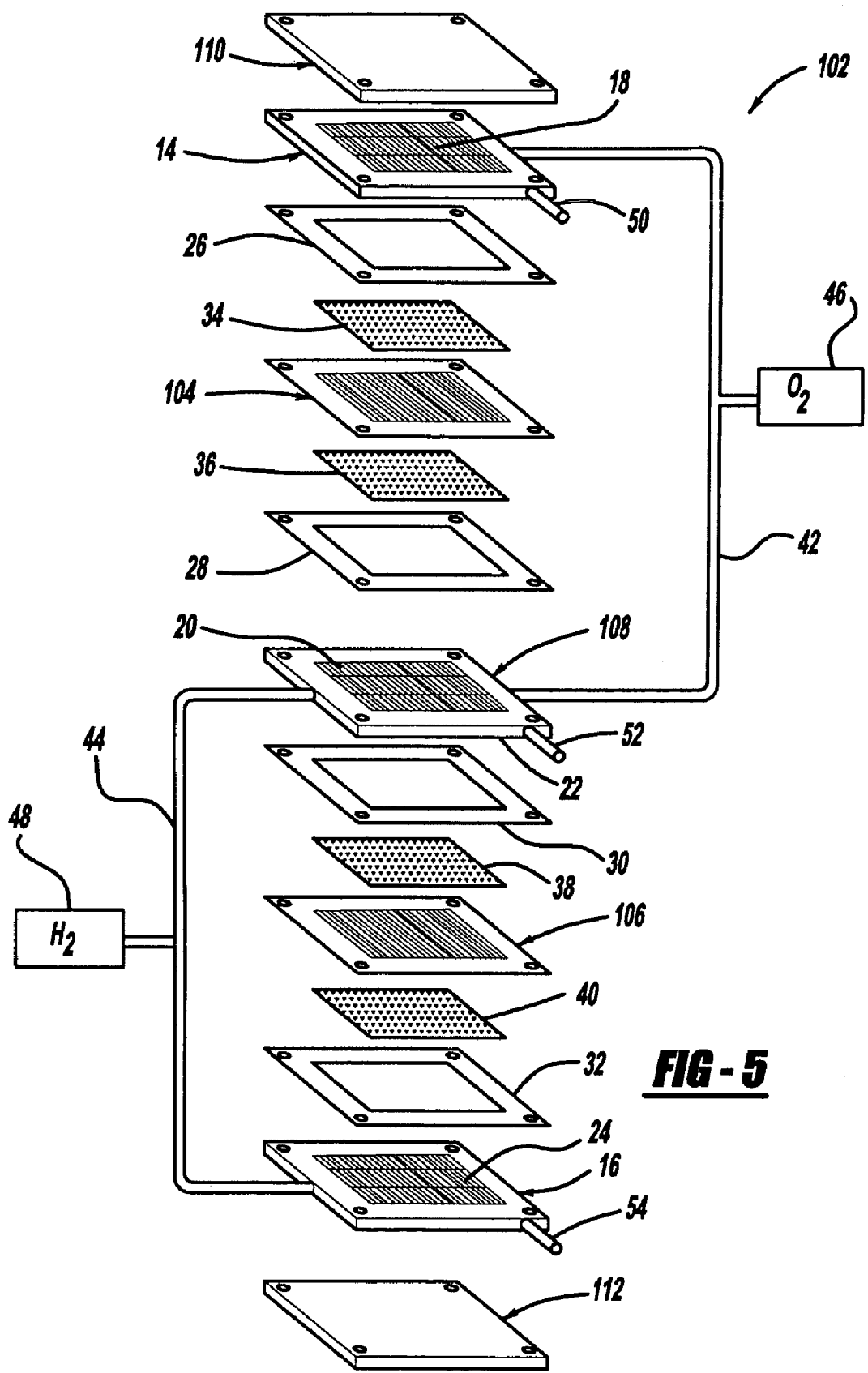
FIG. 5 is an expanded diagram of the construction of a typical multi-cell stack, showing just two cells for clarity.

Diffusion media of the invention are used in fuel cells to improve cell performance. FIG. 5 is an expanded view showing some details of the construction of a typical multi-cell stack, showing just two cells for clarity. As shown, the bipolar fuel cell stack 102 has a pair of membrane electrode assemblies (MEA) 104 and 106 separated from each other by an electrically conductive fuel distribution element 108, hereinafter bipolar plate 108. The MEA's 104 and 106 and bipolar plate 108 are stacked together between stainless steel clamping plates or end plates 110 and ~112 and end contact elements 14 and 16. The end contact elements 14 and 16, as well as both working faces of the bipolar plate 108, contain a plurality of grooves or channels 18, 20, 22, and 24 respectively, for distributing fuel and oxidant gases (i.e. hydrogen and oxygen) to the MEA's 104 and 106. Non-conductive gaskets 26, 28, 30, and 32 provide seals and electrical insulation between several components of the fuel cell stack. Gas permeable conductive materials are typically carbon/graphite diffusion papers 34, 36, 38, and 40 that press up against the electrode faces of the MEA's 104 and 106. The end contact elements 14 and 16 press up against the carbon graphite diffusion media 34 and 40 respectively, while the bipolar plate 108 presses up against the diffusion medium 36 on the anode face of MEA 104, and against carbon graphite diffusion medium 38 on the cathode face of MEA 106. Oxygen is supplied to the cathode side of the fuel cell stack from storage tank 46 by appropriate supply plumbing 42, while hydrogen is supplied to the anode side of the fuel cell from storage tank 48, by appropriate supply plumbing 44. Alternatively, ambient air may be supplied to the cathode side as an oxygen source and hydrogen may be supplied to the anode from a methanol or gasoline reformer. Exhaust plumbing (not shown) for both the hydrogen and oxygen sides of the MEA's 104 and 106 will also be provided. Additional plumbing 50, 52, and 54 is provided for supplying liquid coolant to the bipolar plate 108 and end plates 14 and 16. Appropriate plumbing for exhausting coolant from the coolant bipolar plate 108 and end plate 14 and 16 is also provided, but not shown.

Figure 6:
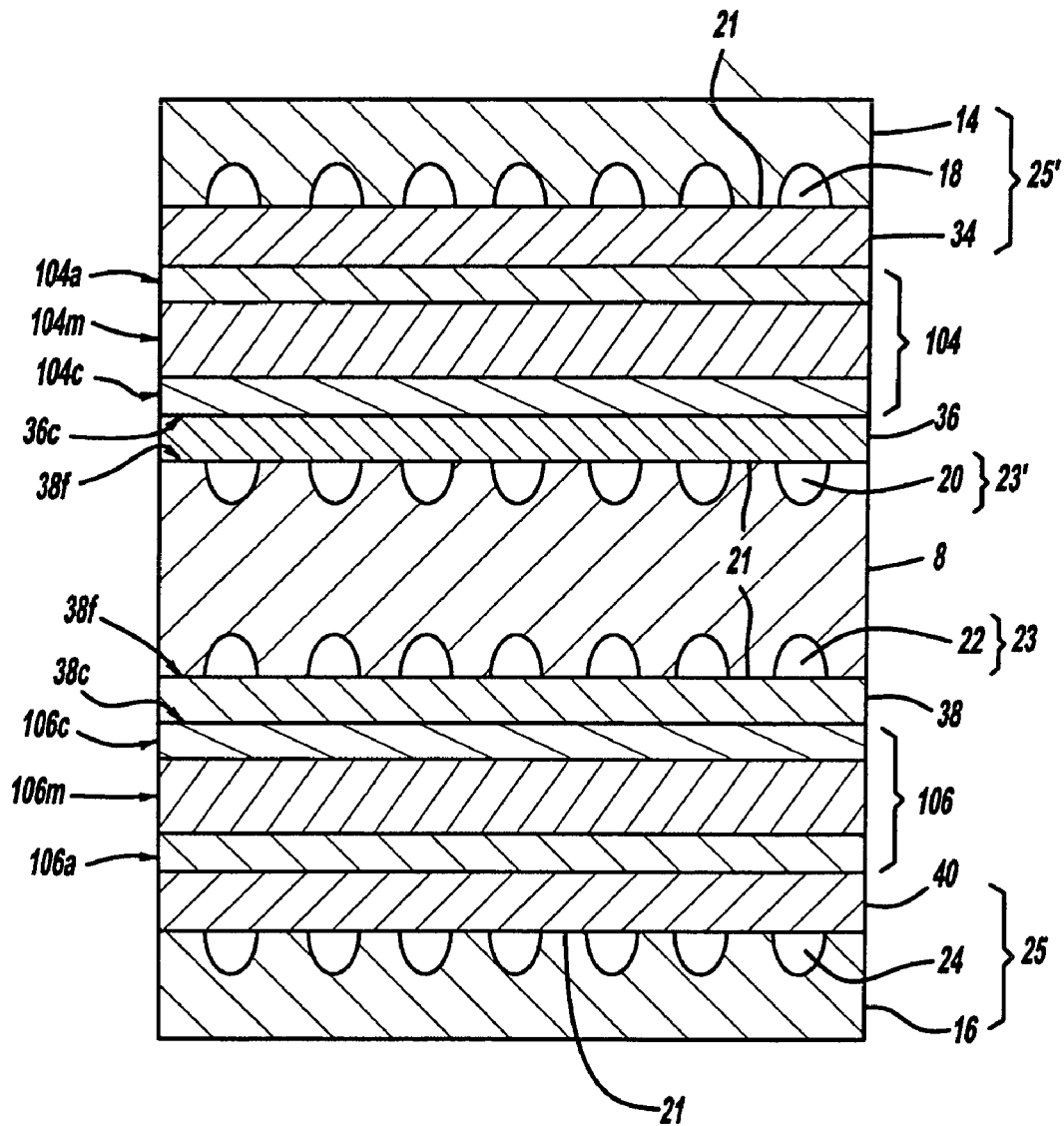
FIG. 6 shows a cross-sectional view of two cells of FIG. 5 after assembly.

FIG. 6 shows a cross-sectional view of two cells of FIG. 5 after assembly. MEA 104 is further depicted as containing a proton exchange membrane 104m sandwiched between an anode 104a and a cathode 104c, while similarly MEA 106 contains a PEM 106m between an anode 106a and a cathode 106c. Anode flow fields 25 and 26' are adjacent the anodes 104a and 106a, while cathode flow fields 23 and 23' are adjacent the cathodes 104c and 106c. Diffusion media 34 and 40 are provided on the anode side of MEA's 104 and 106 respectively. Diffusion media 36 and 38 of the invention are provided between the cathodes 104c and 106c respectively and flow fields 23' and 23 respectively. The side of the diffusion medium 36 facing the cathode is designated as 36c and contains a microporous layer comprising carbon particles and fluorocarbon polymer particles, while the side of the diffusion medium 36 exposed to the flow field 23' is designated as 36f. The flow field 23' is made up of flow channels 20 and lands 21 in the bipolar plate 108, while the flow field 23 is made up of flow channels 22 and lands 21.

Similarly, diffusion medium 38 of the invention is shown with a side 38c facing the cathode 106c of MEA 106 and a side 38f facing the flow field 23 of the bipolar plate 108. Preferably, diffusion media 36 and 38 are coated with fluorocarbon on side 36f and 38f respectively, wherein a homogeneous coating is preferred.

In one aspect, the invention provides a diffusion medium for a PEM fuel cell that is a multilayer gas distribution structure. The layers of the multilayer diffusion structure have selected chemical and physical properties. Together the layers facilitate transport of reactant gas to the electrode while improving water management.

Water management in the cell is important and key to successful long-term operation. The diffusion structure aids in water management in the cell. Concentrating on the diffusion media 36 and 38 of the invention, the diffusion media have several specific functions. They provide reactant gas access from flow field channels to catalyst layers including in-plane permeability to regions adjacent to the lands. It further provides for passage or removal of product water from the cathode area to flow field channels, also including in-plane permeability from the region adjacent to the lands. In addition, as noted above, the media provide for electrical conductivity and heat conductivity to provide for optimum operation of the cell. In particular, the diffusion media 36 and 38 operate to remove product water from the cathodes 104c and 106c and to release water into the flow fields 23 and 23'.

The invention has been described above with respect to preferred embodiments. Further non-limiting examples are given in the Examples that follow.

EXAMPLES

Example 1

Toray TGP-H-060 Carbon Fiber Paper is dipped into a 3% PTFE solution (diluted from DuPont T-30 solution) for 4 minutes. The paper is taken out of the solution and laid on a solid surface, such as glass, stainless steel, or aluminum sheet. Infrared heat is applied above the soaked carbon fiber paper from an infrared panel heater for a time sufficient to dry the paper. The drying time is dependent on the input power of the infrared heater and the distance between the heater and sample. For this example case, the temperature on the carbon fiber paper is about 64° C. and it takes about 10 minutes for the paper to dry. After the paper is fully fry, a paste containing 2.4 grams acetylene black, 1.33 grams of a 60% PTFE dispersion, 31.5 mL isopropanol, and 37 mL deionized water is rod coated on the back (i.e., the side held against the solid glass during drying) of the carbon fiber paper after drying. Then the carbon paper with the paste is sintered by heating at 380° C. This is a single sinter process. The final solids loading of this microporous layer was 1.15 mg/cm$^2$.

Comparative Example 1

A diffusion medium is prepared as in Example 1 except that in addition the carbon fiber paper is sintered at 380° C. after the infrared drying step before application of the paste. This is a double sinter process.

Example 2

Figure 7:
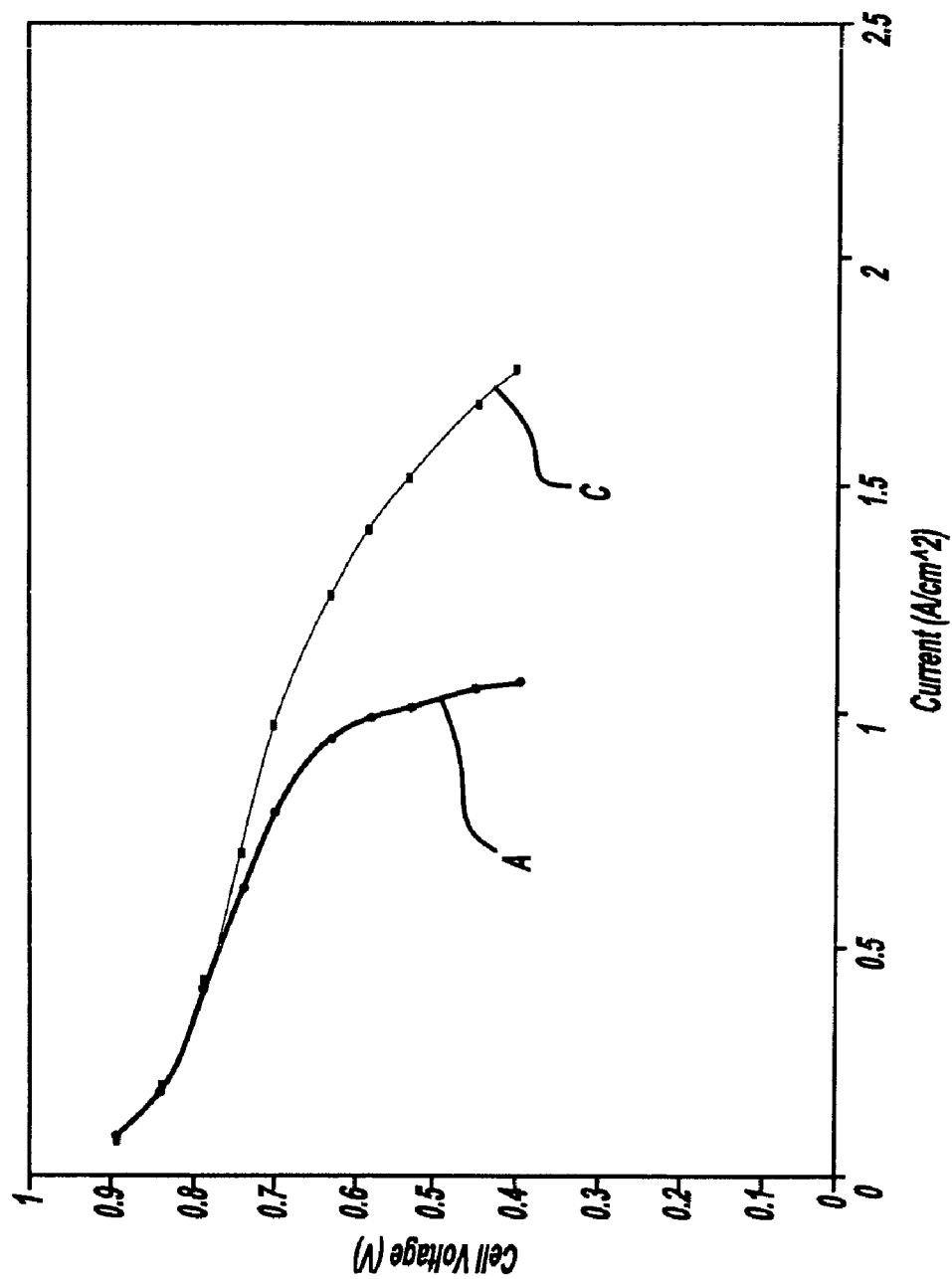
FIGS. 7 and 8 are graphs showing current voltage performance of embodiments of the invention.

The diffusion media prepared in Example 1 and Comparative Example 1 are tested in fuel cells, with results in FIG. 7. FIG. 7 shows current versus voltage curves for two cells, A and C. The fuel cell is composed of a pair of serpentine graphite flow fields with 50 cm$^2$ active area. The MEA used in the test is Gore 5510 (25 μm thick) MEA. The operating conditions are as following: cell temperature is 60° C., anode is pure $H_2$, cathode is air, the gas outlet pressure is 270 kpa (absolute) and the inlet gas for anode and cathode are both under 100% relative humidity, which results in about 307% outlet relative humidity during operation. In some cases, a standard diffusion media is used in the anode side. A standard diffusion media is prepared via the following process: Toray TGP-H-060 Carbon Fiber Paper is dipped into a 3% PTFE solution (diluted from DuPont T-30 solution) for 4 minutes. The paper is taken out of the solution and then dried on stainless steel racks at 90° C. for 30 min in a convection oven. The carbon fiber paper is further sintered at 380° C. No additional paste or microporous layer is applied. Cell A is made with the diffusion medium of comparative Example 1. Cell A contains the Comparative Example 1 diffusion medium on both the anode and the cathode side. Cell C contains diffusion media as prepared in Example 1. Cell C contains the Example 1 diffusion medium on both the anode and the cathode side. Cell C, containing a diffusion medium according to the invention, shows advantageous properties of current versus cell voltage at a high outlet humidity (307%). This represents improved water management capability under this wet condition. When cells A and C are tested under a drier cell operating condition (e.g., when the gas outlet pressure is 150 kPa (absolute), the inlet gas for anode and cathode are both under 66% relative humidity, and the outlet relative humidity is only 110%), the current voltage curves for both cells is the same.

Example 3

This example illustrates preparing a diffusion medium by drying the paper with the back open. Toray TGP-H-060 Carbon Fiber Paper is dipped into a 3% PTFE solution (diluted from DuPont T-30 solution) for 4 minutes. The paper is taken out of the solution and laid on stainless steel rack. The stainless steel rack only supports the edges of the paper and leaves most of the paper open to air. Infrared heat is applied above the soaked carbon fiber paper from an infrared panel heater for a time sufficient to dry the paper. The drying time is dependent on the input power of the infrared heater and the distance between the heater and sample. For this example, the temperature on the carbon fiber paper is about 64° C. and it takes about 8 minutes for the paper to dry. After the paper is fully dry, a paste containing 2.4 grams acetylene black, 1.33 grams of a 60% PTFE dispersion, 31.5 mL isopropanol, and 37 mL deionized water is rod coated on the back (i.e., the side held against the rack during drying) of the carbon fiber paper after drying. Then the carbon paper with the paste is sintered by heating at 380° C. This is a single sinter process, which leaves a loading of 1.15 mg/cm$^2$ solids on the substrate.

Comparative Example 3

A diffusion medium is prepared as in Example 3 except that in addition the carbon fiber paper is sintered 380° C. after the infrared drying step but before application of the paste. This is a double sinter process.

Example 4

Figure 8:
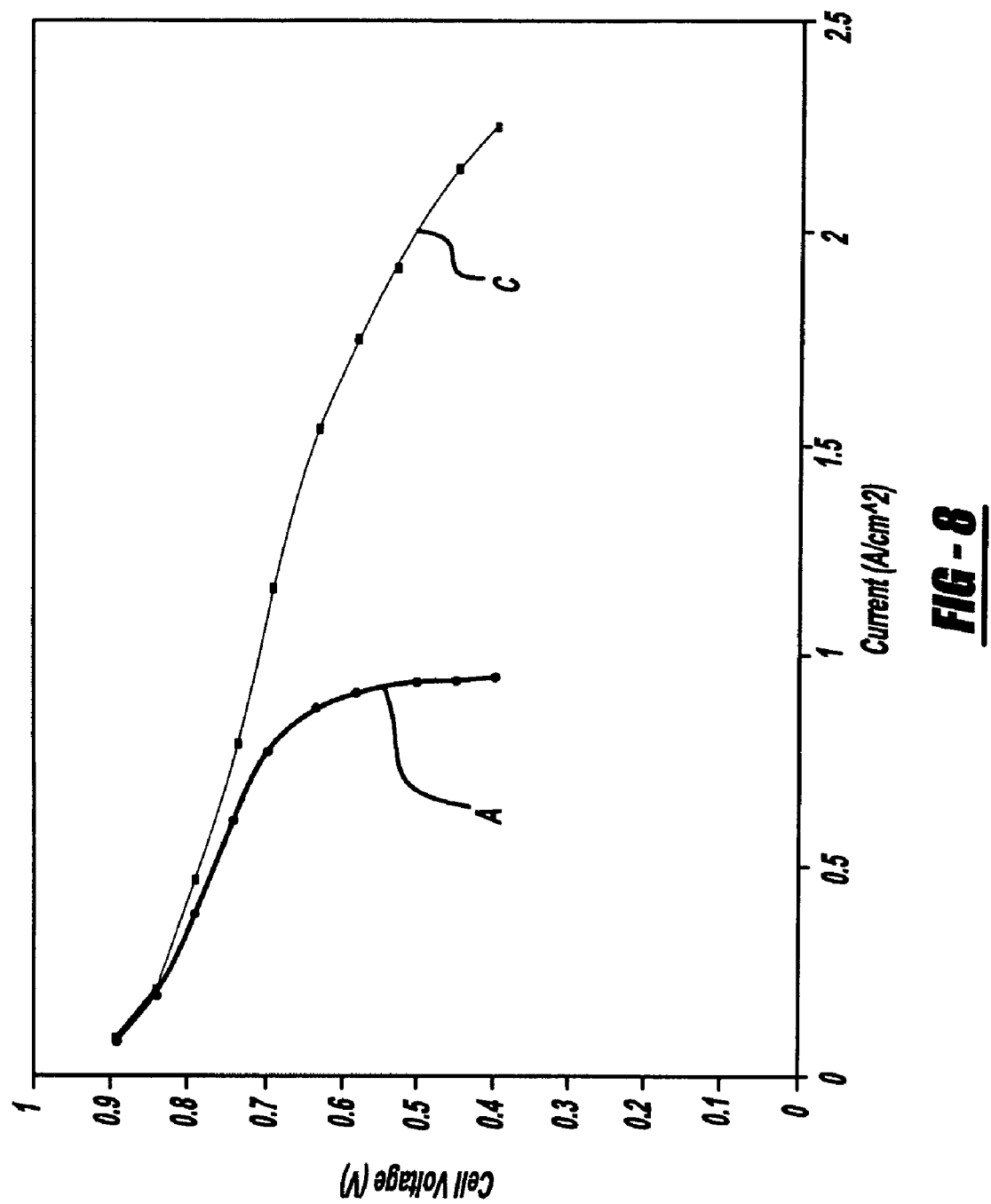

Cells A and C are prepared and current voltage curves obtained as in Example 2, except that the cells contained the diffusion media of Example 3 or Comparative Example 3 in place of those of Example 1 and Comparative Example 1, respectively. Current voltage curves of the cells run at 307% relative outlet humidity are given in FIG. 8. Cell C, containing a diffusion medium according to the invention, shows advantageous properties of current versus cell voltage at a high outlet humidity (307%). This represents improved water management capability under this wet condition. The voltage current curves of both cells A and C were the same when the cells were operated at a 110% outlet relative humidity.

Although the invention has been described with respect to various preferred embodiments, including the embodiment or embodiments considered at the current time to be most advantageous, it is to be understood the invention is not limited to the embodiments disclosed. Variations and modifications as would occur to one of skill in the art upon reading the disclosure are also within the scope of the invention, which is defined in the appended claims.

We claim:

1. A method for preparing a diffusion medium for use in a PEM fuel cell, comprising:
    applying a polymer composition comprising a first fluorocarbon polymer, a surfactant, and a solvent to at least one surface of an electrically conductive porous substrate to form a coated substrate in the form of a coated sheet having two sides;
    removing the solvent from the coated substrate without removing the surfactant;
    thereafter applying a microporous layer comprising carbon particles and a second fluorocarbon polymer to the coated substrate; and
    thereafter heating the substrate at a temperature sufficient to remove the surfactant and sinter the first and second fluorocarbon polymers,
    wherein no sintering is carried out between removing the solvent and applying the microporous layer.

2. A method according to claim 1, wherein the substrate comprises a carbon fiber based material.

3. A method according to claim 1, wherein removing the solvent comprises heating above room temperature.

4. A method according to claim 1, wherein removing the solvent comprises exposing the substrate to infrared radiation.

5. A method according to claim 3, wherein one side of the substrate is blocked during the heating.

6. A method according to claim 3, wherein both sides of the substrate are open during the heating.

7. A method according to claim 4, wherein one side of the substrate is blocked during exposure to the infrared radiation.

8. A method according to claim 4, wherein both sides of the substrate are open during exposure to the infrared radiation.

9. A method according to claim 4, comprising a continuous process.

10. A method according to claim 1, wherein the first fluorocarbon polymer comprises polytetrafluoroethylene.

11. A method according to claim 1, wherein the second fluorocarbon polymer comprises polytetrafluoroethylene.

12. A method according to claim 1, wherein the microporous layer comprises acetylene black and polytetrafluoroethylene.

13. A method according to claim 1, comprising heating the substrate above 290° C. to remove the surfactant and sinter the fluorocarbon polymers.

14. A method according to claim 1, comprising a continuous process.

15. A method according to claim 1, wherein removing the solvent comprises evaporating the solvent while the coated substrate is held in contact with a pattern member comprising openings, and wherein the first fluorocarbon polymer is deposited at the openings upon evaporation of the solvent.

16. A method according to claim 1, comprising applying the first fluorocarbon polymer in a pattern on surface of the sheet, and applying the microporous layer on the other surface.

17. A fuel cell comprising at least one diffusion medium made by a process according to claim 1.

18. A fuel cell comprising at least one diffusion medium made by a process according to claim 4.

19. A method for making a diffusion medium for use in a PEM fuel cell, comprising
    immersing an electrically conductive porous substrate in a polymer composition comprising a first fluorocarbon polymer, solvent, and a surfactant, wherein the substrate is in the form of a sheet having two surfaces;
    removing the solvent from the substrate by exposing at least one surface of the substrate to infrared radiation;
    applying a coating composition comprising carbon particles and particles of a second fluorocarbon polymer onto a surface of the substrate to form a coated substrate; and
    heating the coated substrate above 290° C. to remove the surfactant and sinter the fluorocarbon polymers.

20. A method according to claim 19, wherein one surface of the substrate is exposed to infrared radiation and the other surface of the substrate is blocked during exposure to infrared radiation.

21. A method according to claim 19, wherein one surface of the substrate is exposed to infrared radiation and the other surface of the substrate is open during exposure to infrared radiation.

22. A method according to claim 19, comprising exposing only one surface of the substrate to infrared radiation and applying the coating composition to the surface of the substrate not exposed to infrared radiation.

23. A method according to claim 19, wherein the first fluorocarbon polymer comprises polytetrafluoroethylene.

24. A method according to claim 19, wherein the second fluorocarbon polymer comprises polytetrafluoroethylene.

25. A method according to claim 19, wherein the coating composition comprises acetylene black and polytetrafluoroethylene.

26. A fuel cell comprising at least one diffusion medium made by a process according to claim 19.

27. A fuel cell stack, comprising a plurality of fuel cells according to claim 26.

* * * * *